US006685563B1

(12) United States Patent
Meekins et al.

(10) Patent No.: US 6,685,563 B1
(45) Date of Patent: Feb. 3, 2004

(54) PROGRAMMABLE BONUS GAMING DEVICE HAVING COIN-IN THREHOLD CRITERIA ADAPTED FOR INTERCONNECTION WITH CONVENTIONAL GAMING DEVICE

(76) Inventors: John P. Meekins, 1806 Winding Oaks Way, Naples, FL (US) 34109; Troy DeFrees-Parrott, 11535 E. Ranch Gate Rd., Scottsdale, AZ (US) 85255

( * ) Notice: Subject to any disclaimer, the term of this patent is extended or adjusted under 35 U.S.C. 154(b) by 0 days.

(21) Appl. No.: 09/517,999

(22) Filed: Mar. 2, 2000

Related U.S. Application Data

(60) Provisional application No. 60/122,914, filed on Mar. 5, 1999.

(51) Int. Cl.[7] .......... A63F 13/00

(52) U.S. Cl. .......... 463/25; 463/17; 463/20; 463/42; 273/138.2

(58) Field of Search .......... 463/16, 17, 20, 463/21, 25, 27, 18–19, 40–42; 273/138.1, 138.2, 139, 143 R

(56) References Cited

U.S. PATENT DOCUMENTS

| | | | | | |
|---|---|---|---|---|---|
| 4,856,787 | A | * | 8/1989 | Itkis | 273/237 |
| 5,259,613 | A | * | 11/1993 | Marnell, II | 463/42 |
| 5,324,035 | A | | 6/1994 | Morris et al. | 273/138 |
| 5,344,144 | A | | 9/1994 | Canon | 273/138 |
| 5,398,932 | A | | 3/1995 | Eberhardt et al. | 273/138 |
| 5,564,700 | A | | 10/1996 | Celona | 463/27 |
| 5,586,937 | A | | 12/1996 | Menashe | 463/41 |
| 5,611,730 | A | | 3/1997 | Weiss | 463/20 |
| 5,639,088 | A | | 6/1997 | Schneider et al. | 273/138.2 |
| 5,655,961 | A | * | 8/1997 | Acres et al. | 463/25 |
| 5,685,775 | A | | 11/1997 | Bakoglu et al. | 463/41 |
| 5,722,891 | A | * | 3/1998 | Inoue | 463/20 |
| 5,743,798 | A | * | 4/1998 | Adams et al. | 463/17 |
| 5,766,076 | A | | 6/1998 | Pease et al. | 463/27 |
| 5,823,874 | A | | 10/1998 | Adams | 463/17 |
| 5,848,932 | A | | 12/1998 | Adams | 463/20 |
| 5,851,148 | A | | 12/1998 | Brune et al. | 463/25 |
| 5,855,515 | A | | 1/1999 | Pease et al. | 463/27 |
| 5,876,284 | A | | 3/1999 | Acres et al. | 463/25 |
| 5,882,261 | A | | 3/1999 | Adams | 463/20 |
| 5,885,158 | A | | 3/1999 | Torango et al. | 463/27 |
| 5,934,672 | A | | 8/1999 | Sines et al. | 273/143 R |
| 5,984,782 | A | | 11/1999 | Inoue | 463/20 |
| 6,003,867 | A | | 12/1999 | Rodesch et al. | 273/143 R |
| 6,004,207 | A | | 12/1999 | Wilson, Jr. et al. | 463/20 |
| 6,033,307 | A | | 3/2000 | Vancura | 463/20 |
| 6,059,289 | A | | 5/2000 | Vancura | 273/143 R |
| 6,071,190 | A | | 6/2000 | Weiss et al. | 463/25 |
| 6,110,043 | A | | 8/2000 | Olsen | 463/27 |
| 6,375,567 | B1 | * | 4/2002 | Acres | 463/25 |

* cited by examiner

*Primary Examiner*—Jessica Harrison
*Assistant Examiner*—Aaron Capron
(74) *Attorney, Agent, or Firm*—Raymond A. Nuzzo

(57) ABSTRACT

A method of operating a wagering game of chance, comprising the steps of providing a gaming device comprising a base gaming unit providing a base game and a bonus gaming unit providing a bonus game, providing a player with an opportunity to place a wager in order to play the base game, and providing the player with an opportunity to play the bonus game when the wagers placed by the player meet predetermined criteria.

10 Claims, 5 Drawing Sheets

PROGRAMMABLE BONUS GAMING DEVICE HAVING COIN-IN THREHOLD CRITERIA ADAPTED FOR INTERCONNECTION WITH CONVENTIONAL GAMING DEVICE

This application claims the benefit of commonly owned and U.S. Provisional Application Serial No. 60/122,914, filed Mar. 5, 1999.

BACKGROUND OF THE INVENTION

1. Field of the Invention

The present invention relates to gaming devices.

2. Problem to be Solved

Gaming machines or devices such as mechanical, electronic or video slot machines, video lottery terminals, video poker machines, video black jack, etc. have become very popular at casinos and lottery locations. Prospective players are always looking for new gaming machines that can provide the players with additional payouts above the payouts of the base game. Players also look for gaming machines that are relatively more entertaining. On the other hand, casinos and wagering establishments are interested in gaming machines that will (i) attract more players, (ii) encourage player loyalty, and (iii) increase revenues to the casinos and wagering establishments.

What is needed is a new and improved gaming machine that meets the needs of the players and casinos or wagering establishments.

It is an object of the present invention to provide a bonus gaming device that can be interconnected with existing or new standard gaming machines or devices.

It is an object of the present invention to provide a bonus gaming device that can be interconnected with existing or new standard gaming machines or devices to provide an overall gaming machine that is exciting and entertaining.

It is another object of the present invention to provide a bonus gaming device that can be interconnected with existing or new standard gaming machines or devices so as to provide an overall gaming machine that offers players a relatively higher level of entertainment.

It is another object of the present invention to provide a bonus gaming device that can be interconnected with existing gaming devices so as to attract relatively more players than the existing gaming device by itself.

It is a further object of the present invention to provide a bonus gaming device that can be interconnected with existing gaming devices and which increases revenue to casinos or wagering establishments.

It is an object of the present invention to provide a bonus gaming device that can be interconnected with existing gaming machines and which can be manufactured at a reasonable cost.

Still other objects and advantages of the present invention will in part be obvious and will in part be apparent from the specification.

SUMMARY OF THE INVENTION

In one aspect, the present invention is directed to a method of operating a wagering game of chance, comprising the steps of providing a gaming device comprising a base gaming unit providing a base game and a bonus gaming unit providing a bonus game, providing a player with an opportunity to place a wager in order to play the base game, and providing the player with an opportunity to play the bonus game when the wagers placed by the player meet predetermined criteria.

In one embodiment, the base gaming unit is configured to accept coins as wagers and the predetermined criteria is a predetermined threshold defining a cumulative amount of coins that the player must input into the base gaming unit in order to advance to the bonus game provided by the bonus gaming unit.

In another embodiment, the base gaming unit is configured to accept credit as wagers and the predetermined criteria is a predetermined threshold defining a cumulative amount of credit that the player must play on the base gaming unit in order to advance to the bonus game.

The method further includes the steps of inhibiting further play of the base game when the predetermined criteria is fulfilled, generating a totally impartial, random number that represents the predetermined threshold, and inhibiting further play of the bonus game upon the occurrence of a predetermined event.

In one embodiment, the base gaming unit includes a device for providing winnings to the player, and the method further comprises the step of providing winnings of the bonus game to the player through the device of the base gaming unit.

In another embodiment, the method further comprises the step of providing an indication to the player that the player is entitled to play the bonus game.

In yet another embodiment, the bonus gaming unit comprises electronic circuitry for controlling the functions of the bonus gaming unit and the gaming device further includes a lottery terminal in electronic data communication with the electronic circuitry of the bonus gaming unit, and the method further comprises the step of providing the player with an opportunity to play in a lottery drawing provided by the lottery bonus gaming unit when the wagers placed by the player meet predetermined criteria.

In a related aspect, the present invention is directed to a gaming device, comprising, a base gaming unit providing a base game, a bonus gaming unit providing a bonus game, means for receiving a wager in order to play the base game, and means for advancing a player to the bonus game when the wagers placed by the player meet predetermined criteria.

The base gaming unit includes a device for providing winnings to the player, and the bonus gaming unit further comprises means for providing winnings of the bonus game to the player through the device of the base game unit. In one embodiment, the device comprises a coin chute and the bonus gaming unit further comprises means for distributing coins to the player through the coin chute upon winning the bonus game. In another embodiment, the device comprises a credit meter and the bonus gaming unit further comprises means for indicating the amount of winnings on the credit meter.

In a preferred embodiment, the gaming device further comprises means for visually and audibly indicating that the player is entitled to play the bonus game.

In a further embodiment, the bonus gaming unit comprises electronic circuitry for controlling the functions of the bonus gaming unit and the gaming device further includes a lottery terminal in electronic data communication with the electronic circuitry of the bonus gaming unit. The bonus gaming unit further comprises means for activating the lottery terminal to enable the player to participate in a lottery drawing when the wagers placed by the player meet predetermined criteria.

In yet another aspect, the present invention is directed to a gaming device, comprising a base gaming unit providing a base game, a lottery gaming unit comprising a video lottery terminal which displays a lottery drawing, and means for enabling a player to participate in the lottery drawing upon the occurrence of a predetermined event.

In a further aspect, the present invention is directed to a gaming device, comprising a base gaming unit providing a base game wherein the base gaming unit has electronic circuitry for controlling the functions of the base gaming unit, a bonus gaming unit for providing a bonus game wherein the bonus gaming unit has electronic circuitry for controlling the functions of the bonus gaming unit and for effecting electronic communication with the electronic circuitry of the base gaming unit, a video lottery terminal for providing a lottery drawing wherein the video lottery terminal has electronic circuitry in electronic communication with the electronic circuitry of the bonus gaming unit, and means for enabling a player to participate in the lottery drawing upon the occurrence of a predetermined event.

BRIEF DESCRIPTION OF THE DRAWINGS

The features of the invention are believed to be novel. The figures are for illustration purposes only and are not drawn to scale. The invention itself, however, both as to organization and method of operation, may best be understood by reference to the detailed description which follows taken in conjunction with the accompanying drawings in which.

DETAILED DESCRIPTION OF THE INVENTION

In describing the preferred embodiments of the present invention, reference will be made herein to FIGS. 1–5 of the drawings in which like numerals refer to like features of the invention.

Figure 1:
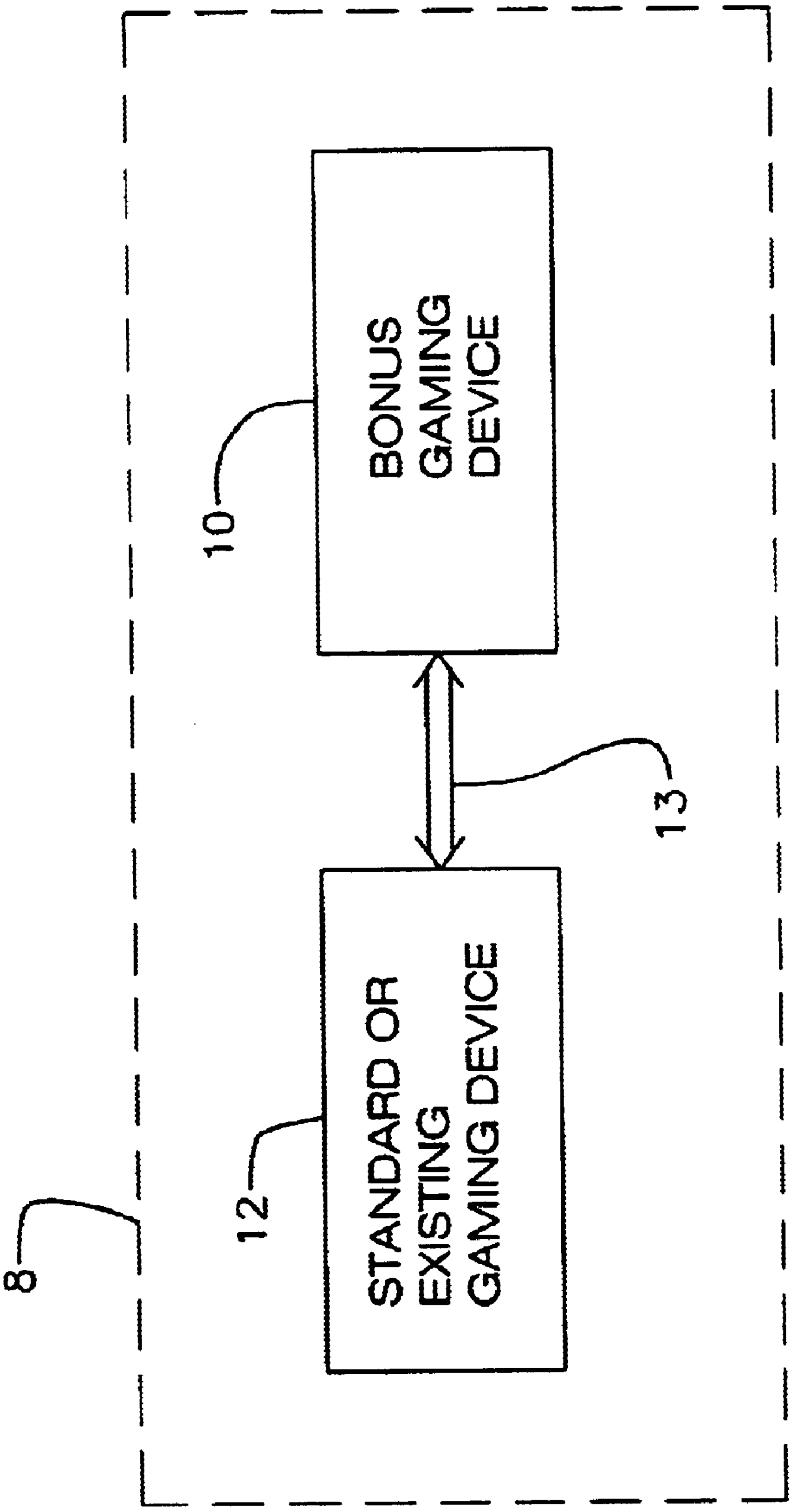
FIG. 1 is a block diagram illustrating a gaming device comprised of a bonus gaming device of the present invention and an existing or standard base gaming device.

Referring to FIG. 1, there is shown overall gaming machine or device 8 that comprises bonus gaming device (or bonus gaming unit) 10 of the present invention and existing or standard gaming device (or base gaming unit) 12. In a preferred embodiment, bonus gaming device 10 is programmable. Bonus gaming device 10 is in electronic data communication with standard or base gaming device 12 via data communication link 13. Communication link 13 can comprise any one of a number of devices or mediums for effecting electronic data communication, e.g. computer data bus, cable, etc. Existing gaming device 12 and bonus gaming device 10 can be any type of gaming device, e.g. mechanical, electronic or video slot machines, video poker machines, video black jack, video lottery terminals, etc. In order to play standard gaming device 12, a player must insert coins into the coin slot and or play credits.

In one embodiment, bonus gaming device 10 of the present invention is removably mounted or attached to the top of standard gaming device 12. In another embodiment, bonus gaming device 10 is mounted within standard gaming device 12.

In accordance with the present invention, when a player inserts a number of coins into the coin slot and or plays the number of credits on the standard gaming machine 12 that meet a predetermined coin input threshold: (i) standard gaming device 12 is shifted into a generally inoperative state such that the player cannot play gaming device 12, and (ii) the player is advanced to a bonus game provided by bonus gaming device 10 wherein the bonus game enables the player to play for winnings that are in addition to the winnings on the standard gaming device 12.

In order to facilitate understanding of the present invention, the ensuing description is in terms of standard gaming device 12 comprising a mechanical slot machine. However, it is to be understood that standard gaming device 12, as stated above, can be configured as an electronic or a video slot gaming device, some of which being described in U.S. Pat. Nos. 5,934,672, 5,984,782, 6,003,867 and 6,004,207, the disclosures of which are incorporated herein by reference. Standard gaming device 12 can also be configured as a video poker gaming device, a video black jack gaming device, a video lottery terminal, European amusement with prizes (AWP) machines, etc. Similarly, in order to facilitate understanding of the present invention, the ensuing description is in terms of the bonus gaming device 10 providing a bonus game comprising an electronic slot machine. However, it is to be understood that bonus gaming device 10 can also be configured to provide any of the aforementioned gaming devices.

Figure 2:
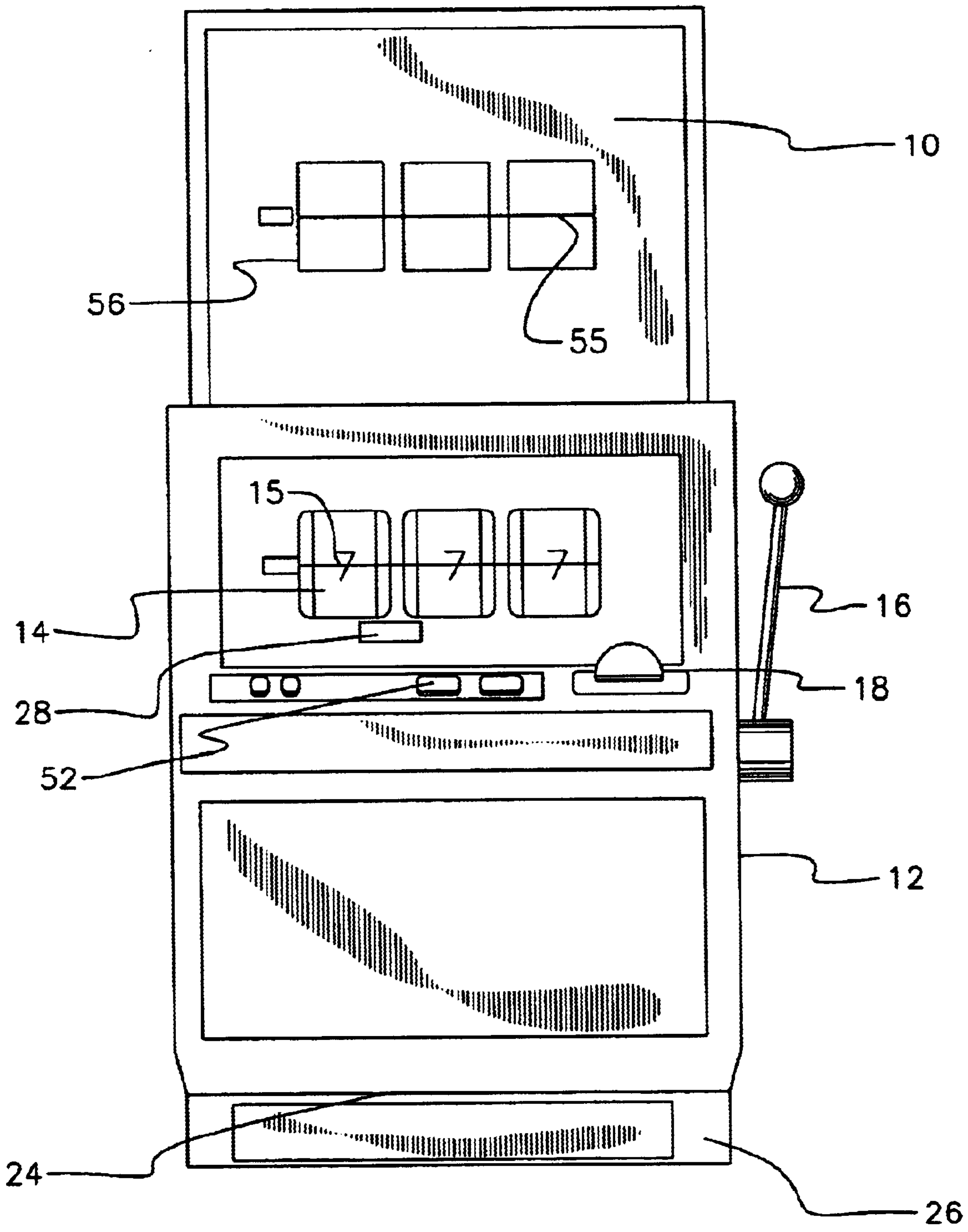
FIG. 2 is a front elevational view illustrating the interconnection of the bonus gaming device of the present invention and the existing or standard gaming device.

Referring to FIG. 2, bonus gaming device 10 is mounted upon or attached to the top standard gaming device 12. Standard gaming device 12 generally comprises rotatable reels 14 wherein each reel comprises a plurality of indicia on the periphery thereof. Standard gaming device 12 further includes mechanical lever 16 and coin slot 18. Each reel 14 is designed to rotate and then stop. If the combination of indicia displayed at pay-line line 15 is one of a predetermined plurality of winning indicia sets, then the player is provided with a winning payout either through coin exit chute 24, which deposits winnings into a coin tray 26, or by increasing the player's credits on a credit meter 28.

In accordance with the present invention, bonus gaming device 10 generates:

a) a randomly selected coin input threshold that defines a number of coins required for a player to advance to the bonus game of bonus gaming device 10, and/or b) a randomly selected credits played threshold required for a player to advance to the bonus game of bonus gaming device 10, and/or c) a plurality or multiplicity of coin-input and/or credit-input thresholds wherein each threshold defines a number of coins and/or credits required for a player to advance to the bonus game of bonus gaming device 10 and wherein all of the coin-input and/or credit-input thresholds must be met in order for a player to advance to the bonus game.

When a player inputs a number of coins into standard gaming device 12 that satisfies either conditions (a) or (c) above, or when the player's credit complies with condition (b) above, bonus gaming device 10 generates control signals that shift standard gaming device 12 into a generally inoperative state such that the player cannot play device 12, and enables the player to play the bonus game of bonus gaming device 10 for a range of bonus payouts that are in addition to the payout of standard gaming device 12. The aforementioned control signals are described in detail in the ensuing description.

As stated above, bonus gaming device 10 can be configured as any type of bonus game. For example, the bonus game provided by bonus gaming device 10 may comprise a set of reels, each of which having indicia on the periphery thereof representing various bonus amounts. The player then uses a player interface to spin or rotate the wheel to determine what bonus amount he or she will win. In another example, the bonus game provided by bonus gaming device 10 may comprise a video slot machine, rotatable stepper reels or stepper lights reflecting bonus game win amounts. These are just a few examples.

Figure 3:
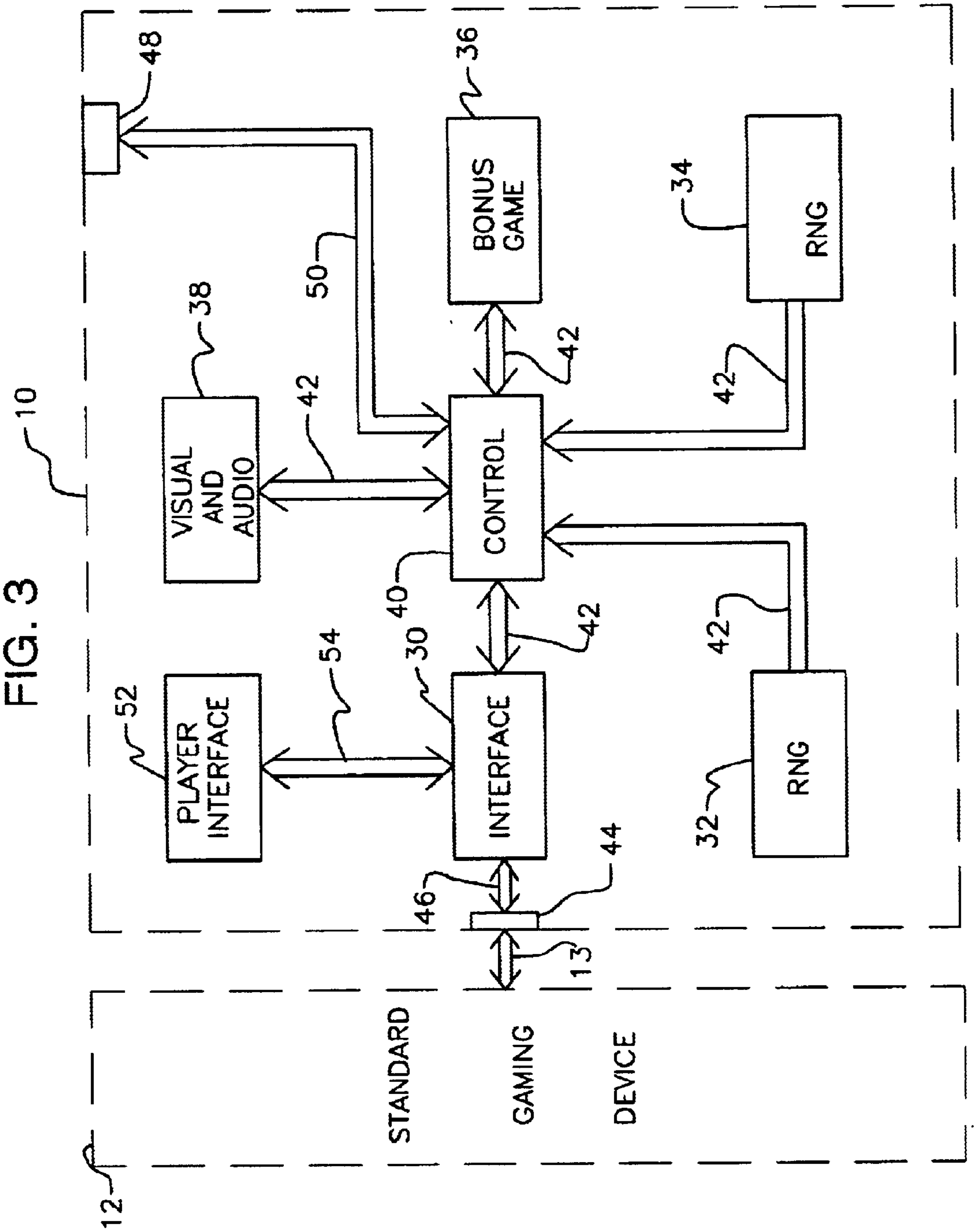
FIG. 3 is a block diagram of the bonus gaming device of the present invention shown in FIG. 1.

Referring to FIG. 3, there is shown a functional block diagram of bonus gaming device 10 of the present invention. Gaming device 10 general comprises interface module 30, random number generator module 32, random number generator module 34, bonus game module 36, visual and audio module 38 and control module 40. Control module 40 comprises a microprocessor that is programmed to implement required functions that are described in the ensuing description. Control module 40 is described in the ensuing description.

Control module 40 is in electronic data communication with all of the aforementioned modules via bi-directional data busses 42. Bonus gaming device 10 further includes interface connector 44 and data bus 46 that effects data transfer between interface module 30 and connector 44. Connector 44 is configured for electronic connection to data communication link 13. Link 13 is in electronic data communication with timing and control circuitry located within standard gaming device 12. Gaming device 10 further includes data input connector 48 and data bus 50 that is connected between connector 48 and control module 40. The purpose of data bus 50 is discussed in detail below. Gaming device 10 also includes player or user interface 52 that provides the user with an enabling means such as a push button, joy stick, video-game pad arm or "touch screen" to activate and thus play the bonus game provided by bonus gaming device 10. For example, in one embodiment, if gaming device 10 is configured as an electronic or video slot machine, user interface 52 provides a "push-button" that the user depresses when he or she desires to activate the bonus game, e.g. spin the reels of the slot machine. In another embodiment, gaming device 10 is configured to include mechanical controls such as a lever (similar to lever 16 of standard gaming device 12). Data bus 54 effects data communication between user interface 52 and interface module 30.

Referring to FIG. 1, interface module 30 comprises data receiver and driver circuitry for transmitting and receiving signals to and from, respectively, standard gaming device 12, control module 40 and user interface 52. Thus, any data signals that interface module 30 receives from standard gaming device 12 and player interface 52 are routed to control module 40. Similarly, any data signals that interface module 30 receives from control module 40 can be routed to standard gaming device 12 and/or user interface 52. In one embodiment, data link 13 is hardwired to signal input and output ports of various components of gaming device 12, e.g. coin acceptor, ticket printer device, coin hopper, button panel, etc. In another embodiment, data link 13 is directly in electronic data communication with the microprocessor unit (or MPU) of gaming device 12.

Standard gaming device 12 outputs a signal comprising an electrical pulse every time a player inserts a coin that registers and/or plays a credit, etc. Interface module 30 receives these "pulse" signals from standard gaming device 12 and outputs a data signal, for input to control module 40 that represents the current total amount of "pulses". Thus, this data signal represents the total amount of coins accepted and/or credits played for all consecutive plays. Standard gaming device 12 also outputs an additional signal that represents the amount of credit a player has accrued during play. Interface module 30 receives this additional signal and routes this signal to control module 40.

Random number generator ("RNG")32 is in data communication with control module 40. In one embodiment, RNG 32 outputs a totally impartial, random data signal that represents the coin-input and/or credit-input threshold i.e. the amount of coins that must be inputted into coin slot 18 and/or credits played in order to advance the player to the bonus game provided by bonus gaming device 10. In another embodiment, RNG 32 outputs a totally, impartial, random data signal that represents an amount of coin-input and/or credit-input a player must achieve in order to advance to the bonus game provided by bonus gaming device 10. RNG 32 outputs the totally impartial, random data signal upon receipt of a control signal (or clock signal) from control module 40.

In an alternate embodiment, RNG 32 comprises a plurality of random number generators that generate a plurality or multiplicity of coin-input and/or credit-input thresholds wherein each threshold defines a number of coins and/or credits required for a player to advance to the bonus game and wherein all of the coin-input and/or credit-input thresholds must be met in order for a player to play the bonus game.

In a further embodiment, bonus gaming device 10 is programmed via an external computer to advance a player to the bonus game when the player inputs an amount of coins that exceeds a predetermined coin-in threshold or plays an amount of credit that exceeds a predetermined credit-played threshold. Specifically, data signals representing the coin-in and credit-played thresholds are generated by an external computer and inputted into bonus gaming device 10 via data input connector 48. Connector 48 is connected to bus 50. As a result, the data signals representing the coin-in and credit-played thresholds are inputted into the microprocessor of control module 40.

In yet a further embodiment, the data representing the coin-in and credit-played threshold is "burned" into the microprocessor of control module 40. Thus in order to change the coin-in and credit-played thresholds, the microprocessor of control module 40 is removed and replaced with a microprocessor that has data "burned" therein which represents the required coin-in and credit-played thresholds.

In yet another embodiment, bonus gaming device 10 includes a CD-ROM drive in electronic data communication with control module 40. Bonus gaming device 10 is programmed via the software on CD-ROM inputted into the CD-ROM drive. The CD-ROM contains data that represents the coin-in and credit-played thresholds. In order to change the coin-in and credit-played thresholds, the CD-ROM currently loaded in the CD-ROM is removed and replaced with a CD-ROM having the desired coin-in and credit-played thresholds.

Referring to FIG. 1, bonus game module 36 provides the bonus game to which the player advances once the number of coins and/or credits played reaches the randomly selected required amount. In a preferred embodiment, module 36 comprises a video monitor or liquid crystal display ("LCD") 56 that can display any one of a variety of games, e.g. video slot machine, video poker, or any other type of video game. In accordance with the present invention, gaming device 10 is programmable such that module 36 may be configured to provide any of the aforementioned games. Module 36 further includes an internal random number generator that controls the bonus game such that the bonus game has totally impartial, random outputs as a function of stimuli provided by the aforementioned random number generator.

Referring to FIG. 1, random number generator ("RNG") 34 is in data communication with control module 40 and outputs a totally impartial, random data signal that represents the amount of payout associated with the bonus game provided by module 36. If the bonus game comprises a slot machine, then the internal random number generator of module 36 ensures random outcomes regarding the resulting combination of reel indicia at the pay-line, and RNG 34 randomly generates a number that represents "pay-out" coins and/or "pay-out" credit, within a range defined by a zero and a predetermined maximum, for each spin of the reels. The random number of coins or amount of credit generated by RNG 34 can be displayed to the player by any one of a variety devices, LEDs, LCD, voice recording, etc. Thus, if a predetermined combination of "reel indicia" arrives at the pay-line 55, then the player receives the pay-out indicated by RNG 34 for that particular spin of the reels. Since the range of possible pay-outs includes zero, it is possible that there could be no bonus pay-out for a particular spin.

RNG 34 may not be used for every type of bonus game provided by module 36. For example, if the bonus game comprises a wheel that has a plurality of indicia indicating various bonus pay-out amounts, then the internal random number generator of module 36 provides the impartial and random results when the wheel is spun by the player. In such a configuration, RNG 34 is disabled by control module 40.

In an alternate embodiment, RNG 34 comprises a plurality of random number generators, each of which having a specific function regarding the pay-out to the player when playing the bonus game. For example, RNG 34 can comprise three random number generators wherein:

a) the first RNG randomly generates a total number of spins to which the player is entitled;

b) the second RNG randomly generates a number representing the total winnings, e.g. total number of coins, that is paid to the player over the total number of spins generated by the first RNG; and c) the third RNG random generates a sequence of numbers that represent the distribution (or breakdown) of the total winnings for each spin.

In one example, the first RNG determines that the player is entitled to five (5) spins, the second RNG determines that the player will win twenty five (25) coins over the five (5) spins, and the third RNG determines that the "per spin" coin winnings, if any, for each of the five spins is 0, 5, 5, 10, 5.

Referring to FIG. 1, video and audio module 38 is in data communication with control module 40 and includes circuitry that provides video and audio information, e.g. music, flashing lights, recorded voice messages, video images, etc. to inform the player that the bonus round has begun and that the player may now initiate play of the bonus game. Module 38 can also be configured to provide audio entertainment as the player plays the bonus game. In one embodiment, module 38 includes a video monitor and the necessary circuitry to provide the information visually. In another embodiment, the information is provided on a portion of video monitor 56 of bonus game module 36.

Control module 40 generally comprises a microprocessor with EPROM (erasable programmable read-only-memory) capability. Such microprocessors are commercially available from a variety of companies such as Intel, Advanced Microdevices, National Semiconductor, etc. The functions of control module 40 include (i) effecting electronic data communication between all modules, (ii) controlling the function of all other modules, (iii) producing timing and synchronization signals, (iv) producing "lock-out" signals that render standard gaming device 12 inoperative, (v) storing bonus game termination criteria, and (vi) providing power to all other modules. Control module 40 is programmed via data received from data input port 48 via data bus 50. For example, control module 40 can be programmed to control (i) module 36 to change the bonus game, and (ii) module 38 to change the visual and audio information. In a preferred embodiment, control module 40 is programmed before bonus gaming device 10 is interconnected with standard gaming device 12.

In a further embodiment, bonus gaming device 10 is remotely linked to standard gaming device 12. In such an embodiment, the bonus gaming device comprises a central computer system located at a remote location but which is in electronic data communication with the electronic circuitry of standard gaming device 12 via a LAN (local area network). The use of a LAN to link independent gaming locations is described in U.S. Pat. No. 5,611,730, the disclosure of which is incorporated herein by reference. In such an embodiment, the central computer system monitors coins inputted into standard gaming machine 12 or the credit played on standard gaming machine 12. Once the coin-in or credit-played threshold is met, the bonus game is implemented on the central computer system. In such an embodiment, a keypad and video screen or display device (e.g. LCD, plasma, etc.) are mounted on standard gaming device 12 to enable a player to input data required for playing the bonus game.

In yet another embodiment, bonus gaming device 10 does not output signals that inhibit the operation of standard gaming device 12 when the coin-in or credit-played thresholds are met. In such an embodiment, the bonus game is automatically activated and runs simultaneously with the game provided by standard gaming device 12.

Operation

The ensuing description will facilitate understanding of the function of gaming device 10 of the present invention and its interrelationship with standard gaming device 12.

a) First, control module 40 receives power and is programmed via power and data signals received from data input port 48 via data bus 50. The data signals include signals that enable control module 40 to control (i) module 36 to provide a particular bonus game, and (ii) module 38 to provide specific visual and audio information. Control module 40 then outputs a control signal to RNG 32. In response, RNG 32 randomly generates a signal representing a coin-input and/or credit-input threshold. This coin-input and/or credit-input threshold signal is stored in the RAM of control module 40.

b) The next step entails applying power to standard gaming device 12 and enabling players to play standard gaming device 12. This is accomplished by the players inserting coins into coin slot 18 and/or by playing credits and activating lever 16 or a button, etc.

c) Once the first the coin is inserted into coin slot 18 or a credit is played, gaming device 12 outputs a pulse that is inputted into interface module 30 via data bus 46. (In an alternate embodiment, device 12 outputs a signal that represents the amount of accrued credit).

d) Interface module 30 receives the pulse from device 12 and begins a counting process (using the appropriate counting circuitry) that keeps track of the number of coins inputted and/or credits played. Interface module 30 then outputs a signal to control module 40 that indicates the current total number of coins inputted and/or credits played. Control module 40 constantly effects comparison between the current total number of coins inputted and/or credits played and the randomly selected coin-in threshold.

e) When the player has inserted a number of coins into coin slot 18 and/or played the number of credits that meet the coin-input and/or credit-input threshold, control module 40 outputs a signal to interface module 30 that inhibits the operation of standard gaming device 12. This "inhibiting signal" configures standard gaming device 12 into an inoperative state. When in the inoperative state, movement of the lever (i.e. lever 16) or pushing the push button fails to effect play of standard gaming device 12. The "inhibiting signal" is also sent to other circuit modules within standard gaming device 12 so as to configure these circuit modules to allow any coin winnings realized from playing the bonus game provided by bonus gaming device 10 to be distributed to the player through coin chute 24. In another embodiment, the winnings are provided to the player in the form of credit that is added to the player's credit that he or she accrued when playing standard gaming device 12.

f) In addition to the "inhibiting signal" outputted by control module 40, module 40 outputs an activation signal to visual and audio module 38. In response, module 38 advances the player to the bonus game through video and audio stimulation. In one embodiment, any "push buttons" or "touch screens" on player interface 54 are illuminated so as to guide the player as to the first step in playing the bonus game. In an alternate embodiment, an indicator is mounted to standard gaming device 12 and electrically connected to interface connector 44. The indicator informs the player that he or she is now entering the bonus round provided by gaming device 10.

g) Next, control module 40 outputs activation signals to RNG 34 and bonus game module 36. In response, RNG 34 outputs a signal that represents a random bonus pay-out. This signal is inputted into control module 40. In response to the activation signal, module 36 is activated and displays the bonus game on the video monitor. The bonus game is now ready to be played by the player.

h) The player then uses player interface 52 to play the bonus game. This can be accomplished by depressing a push button on interface 52. For example, if the bonus game comprises video slots, then the player can effect rotation of the reels by depressing a "spin" button located on interface 52. Interface 52 is also provided with a "touch screen" that can be used to play any one of a variety of bonus games provided by module 36. Such a "touch screen" configuration facilitates the playing of video card games such as video poker, etc. When the player activates the "push button" or "touch screen", electrical "pulse" signals are sent from player interface module 52 to interface module 30. Module 30 routes these signals to control module 40. Control module 40 routes this signal to module 36 to effect play of the bonus game but also keeps track of how many pulses it receives from player interface 52. Thus, if the bonus game comprises a "video slot machine" and control module 40 has been programmed to allow a predetermined amount of "spins" during play of the bonus game, control module 40 terminates the play of the bonus game when the number of times that the player has "spun" the reels equals the predetermined amount of spins stored in the RAM of control module. As previously described above, in one embodiment, RNG 34 comprises a plurality of random number generators wherein one of these RNGs generates a maximum number of spins for the bonus game.

i) As described in step (h), play of the bonus game is effected when bonus game module 36 receives the signal from control module 40. For example, if the bonus game is "video slots", the signal received from control module 40 effects spinning of the reels. Once the reels stop spinning, module 36 outputs a signal representing the resulting combination of "reel indicia" at the pay-line 55.

In one embodiment, control module 40 compares this signal to a table of possible combinations that is stored in the RAM. The table also has data indicating which combination is entitled to a pay-out. If the combination of indicia arriving at the pay-line during play of the bonus game matches a combination stored in RAM that is associated with a pay-out, the player will receive a pay-out that is determined by random number generator ("RNG")34. In another embodiment, the table stored in the RAM of module 40 is not used. Instead, RNG 34 determines whether the player will receives a pay-out and the amount of such a pay-out.

In one embodiment, the pay-out is in terms of coins that are distributed through coin chute 24 of standard gaming device 12. In another embodiment, the pay-out is in terms of credit that is added to a credit meter located in bonus game device 10. In a further embodiment, the pay-out is in terms of credit which is added to the player's accrued credit that was previously earned when playing the standard gaming device 12. In order to provide the player with the pay-out, control module 40 outputs a signal to interface module 30 which transfers the signal to standard gaming device 12 in order to effect coin distribution through coin chute 24 or accrual of credit as discussed above. Control module 40 then outputs a signal to visual and audio module 38 to provide video and audio information that informs the player he or she is a winner.

j) After the player has "spun" the reels of the bonus game, control module 40 prompts RNG 34 to provide another data signal representing another random pay-out amount. This signal is stored in the RAM of control module 40. Control module 40 outputs an activation signal to visual and audio module 38 and player interface module 52 that prompts the player to "play again", i.e. spin again. The steps described in steps (h) and (i) above are then generally repeated until the number of times the player has played the bonus game has reached the predetermined limit. In one embodiment, the predetermined limit is determined by another random number generator.

Figure 4:
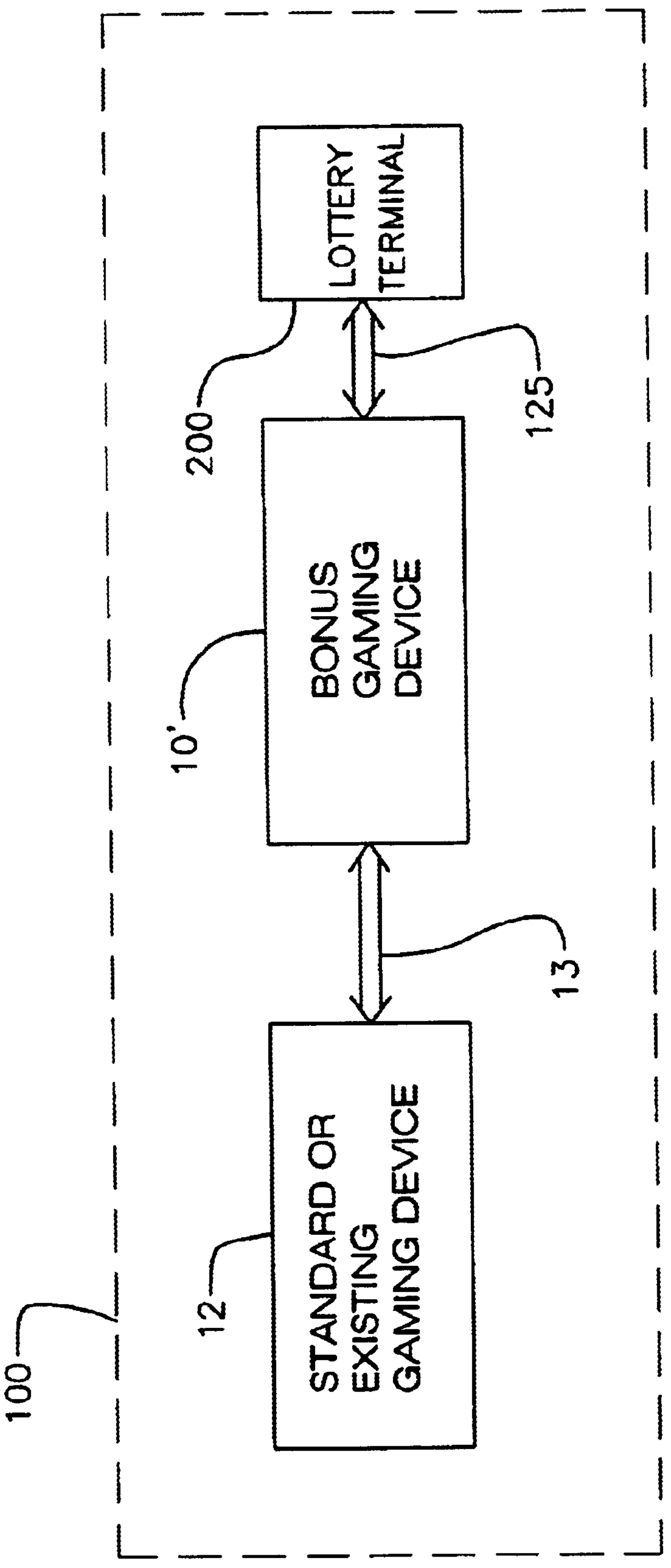
FIG. 4 is a block diagram of an alternate embodiment of the gaming system of the present invention.
Figure 5:
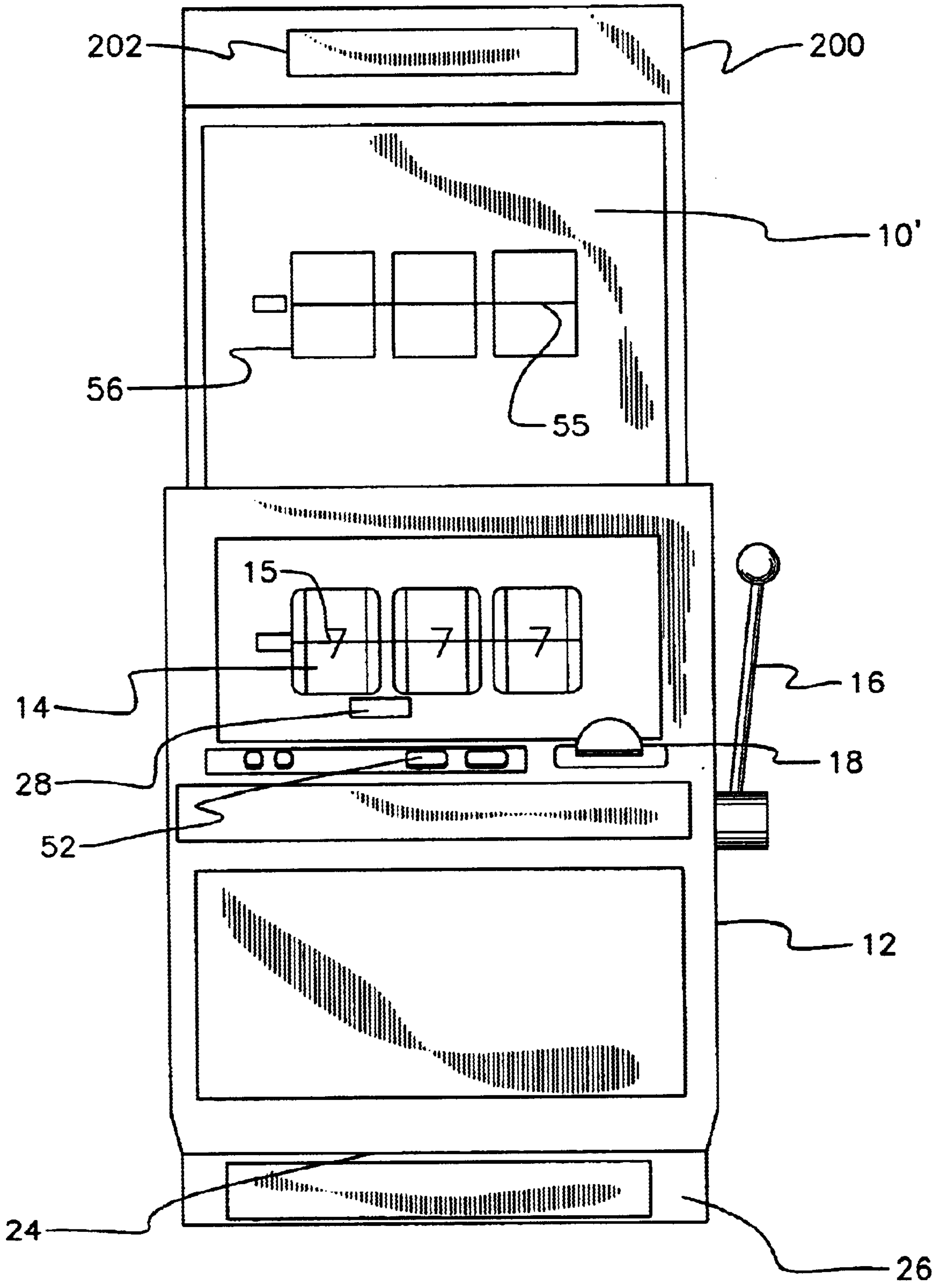
FIG. 5 is a front elevational view illustrating one possible configuration for interconnecting the existing or standard gaming device, the bonus gaming device and lottery terminal of the present invention.

Referring to FIGS. 4 and 5, there is shown alternate gaming system 100 of the present invention. Gaming system 100 generally comprises bonus gaming device 10', standard gaming device 12, data communication link 13, data communication link 125 and lottery terminal 200. Bonus gaming device 10' is substantially the same as bonus gaming device 10. However, bonus gaming device 10' further includes a data communication port and internal data bus that effects data communication between control module 40 and data communication link 125. Data communication link 125 is in data communication with lottery terminal 200 and can comprise any one of a number of devices or mediums for effecting electronic data communication, e.g. computer data bus, cable, etc. Lottery terminal 200 includes display 202. Display 202 can be configured as a liquid-crystal display ("LCD"), plasma display, cathode-ray-tube ("CRT"), etc. In one embodiment, lottery terminal 200 is configured as a video lottery terminal ("VLT")which is described in U.S. Pat. No. 5,398,932, the disclosure of which is incorporated herein by reference.

In one embodiment, bonus gaming device 10' of the present invention is removably mounted or attached to the top of standard gaming device 12. In another embodiment, bonus gaming device 10' is mounted within standard gaming device 12. In a further embodiment, bonus gaming device 10' is remotely linked to standard gaming device 12. Similarly, in one embodiment, lottery terminal 200 is removably mounted or attached to the top of bonus gaming device 10'. In another embodiment, lottery terminal 200 is mounted within bonus gaming device 10'.

In accordance with the present invention, when a player inserts a predetermined amount of coins into standard gaming device 12, bonus gaming device 10' shifts standard gaming device 12 into a generally inoperative state such that the player cannot play gaming device 12, and advances the player to a lottery game provided by lottery terminal 200. Lottery terminal 200 enables the player to play for a jackpot that is in addition to the winnings on the standard gaming device 12.

In another embodiment, bonus gaming device 10' is not used and the operation of standard gaming device 12 is not inhibited when the coin-in or credit-played thresholds are met. In such an embodiment, the player is automatically entered into the lottery drawing while simultaneously playing the game provided by standard gaming device 12.

In a further embodiment, the coin-in or credit-played thresholds are not used to advance the player to the lottery drawing, but rather, other predetermined criteria or events are used to advance the player to the lottery drawing. In one example, when the player has played the game provided by standard gaming device 12 for a predetermined amount of time, the player is advanced to the lottery drawing provided by lottery terminal 200. In another example, a player is advanced to the lottery drawing upon random generation of a number (via a random number generator) that is the same as a predetermined number. These are just a few examples.

In one embodiment, lottery terminal 200 includes the necessary electronic circuitry and microprocessor to provide a graphically generated or pre-recorded periodic lottery drawing in which the player is entitled to participate. In another embodiment, lottery terminal 200 comprises the appropriate electronic circuitry to receive transmissions from a primary central site that presents a live or real-time, pre-recorded or graphically generated lottery drawing.

The jackpot for the lottery game is determined by a wide-area progressive jackpot. Wide-area progressive jackpots are described in the aforementioned U.S. Pat. No. 5,611,730 and U.S. Pat. No. 5,655,961, the disclosure of which is incorporated herein by reference.

Since the jackpot is a progressive jackpot, the winnings would most likely be substantially large. Therefore, if a player should select a winning lottery number, payment is made to the player manually by the casino. In one embodiment, when a player wins the jackpot, video lottery terminal 200 emits a signal to a casino floor controller. In response, casino personnel would tender payment to the winner. In another embodiment, video lottery terminal 200 includes a device for printing a ticket which indicates that the player has won the jackpot. The player then redeems the ticket at the casino.

In a further embodiment, video lottery terminal 200 is configured for use with table games, e.g. Poker, Black Jack, etc. In such an embodiment, a keypad or keyboard is positioned on or near the gaming table. The player is eligible to play the progressive jackpot lottery game if predetermined conditions are met. For example, the player can play the lottery game if:

a) the player's accumulated bets exceed a predetermined amount;

b) the player wins a predetermined amount of hands; or c) the player plays a predetermined amount of hands, regardless or wins, losses or accumulated bets.

While the present invention has been particularly described, in conjunction with specific preferred embodiments, it is evident that many alternatives, modifications and variations will be apparent to those skilled in the art in light of the foregoing description. For example:

a) standard gaming device 12 can be electronic, mechanical or a combination of electronic and mechanical;

b) bonus gaming device 10 of the present invention can be programmed to provide a game that is the same as or different from the game provided by the standard gaming device 12. For example, gaming device 10 may provide a bonus game in the form of "spin the wheel" even though the standard gaming device 12 is a slot machine; and c) Bonus gaming device 10 of the present invention can be programmed in a manner that allows the player to advance to the bonus game of the bonus gaming device 10 when the amount of coins that are inserted into the coin-in slot and or the number of credits played on the standard gaming machine 12 meet a predetermined coin-input and or credit-input threshold.

d) each bonus gaming device 10 can be first mounted to a corresponding standard or existing gaming device and then controlled by a central computer located within the casino. In such a configuration, data input port 48 of each gaming device 10 is in data communication with a central interface system. The interface system is in data communication with the central computer. Casino personnel can individually program each gaming device 10 to activate or inactivate gaming device 10 or provide different bonus games.

Thus, the programmable bonus gaming device of the present invention:

a) cooperates with the standard gaming device to provide an overall game that is exciting and entertaining so as to attract more players;

b) provides players with an additional opportunity to win a bonus pay-out;

c) is transportable and easy to connect to standard gaming devices.

d) can be realized with commercially available electronic and mechanical components;

e) can be interconnected with the standard gaming device and used as described above without altering the software of the standard gaming device;

f) can be interconnected with the standard gaming device and used as described above without knowing or using the protocol of the standard gaming device; and g) is inexpensive to manufacture.

What is claimed is:

1. A networked gaming system, comprising:

a gaming machine located in a gaming establishment and providing a wagering game, the gaming machine having electronic circuitry for controlling the operation of the gaming machine and constantly monitoring all coin-in, the gaming machine having means for placing a wager, a minimum wager amount and a maximum wager amount;

a video lottery terminal located adjacent to the gaming machine, the video lottery terminal, when activated, providing a lottery drawing in which a player may participate, the video lottery terminal having electronic control circuitry in electrical communication with the electronic control circuitry of the gaming machine, the video lottery terminal further comprising a display device and a player interface to allow a player to participate in the lottery drawing when the video lottery terminal is activated;

a central lottery computer located at a remote site and in electronic data communication with the video lottery terminal, the central lottery computer providing a lottery drawing that is displayed by the video lottery terminal;

means for generating a totally impartial, random number that defines the predetermined coin-in threshold that is independent of the minimum wager amount and maximum wager amount of the gaming machine;

said electronic control circuitry of said gaming machine being configured to:

constantly monitor the cumulative coin-in wagered by the player since the player last qualified for and participated in the lottery drawing, constantly compare the cumulative coin-in to the predetermined coin-in threshold, and activate the video lottery terminal so as to enable a player to participate in the lottery drawing when the cumulative coin-in wagered by the player meets the predetermined coin-in threshold.

2. The networked gaming system according to claim 1 wherein the video lottery terminal comprises;

means for generating a lottery ticket; and means for providing the lottery ticket to the player.

3. The networked gaming system according to claim 2 further comprising a casino floor controller that is in electronic communication with the video lottery terminal, said electronic control circuitry of said video lottery terminal providing data to the casino floor control that indicates a player has won the lottery drawing when the player has actually won the lottery drawing.

4. The networked gaming system according to claim 3 means for providing lottery winnings to the player when the said video lottery terminal provides data to the casino floor control that indicates a player has won the lottery drawing.

5. The networked gaming system according to claim 1 wherein the central lottery computer is configured to provide a live lottery drawing to the video lottery terminal.

6. The networked gaming system according to claim 1 wherein the central lottery computer is configured to provide a pre-recorded lottery drawing to the video lottery terminal.

7. The networked gaming system according to claim 1 wherein the central lottery computer is configured to provide a graphically generated lottery drawing to the video lottery terminal.

8. The networked gaming system according to claim 1 wherein the display device of the video lottery terminal comprises a liquid crystal display.

9. A networked gaming system, comprising:

a gaming machine located in a gaming establishment and providing a wagering game, the gaming machine having electronic circuitry for controlling the operation of the gaming machine and constantly monitoring all coin-in, the gaming machine having means for placing a wager, a minimum wager amount and a maximum wager amount;

a video lottery terminal located adjacent to the gaming machine, the video lottery terminal, when activated, providing a lottery drawing in which a player may participate, the video lottery terminal comprising a player interface to allow a player to participate in the lottery drawing when the video lottery terminal is activated, the video lottery terminal comprising electronic circuitry in electrical communication with the electronic circuitry of the gaming machine, the electronic circuitry of the video lottery terminal being configured to:

generate a totally impartial, random number that defines a predetermined coin-in threshold that is independent of the minimum wager amount and maximum wager amount of the gaming machine, constantly monitor the cumulative coin-in wagered by the player since the player last qualified for and participated in the lottery drawing, constantly compare the cumulative coin-in to the predetermined coin-in threshold, and activate the video lottery terminal when the cumulative coin-in meets the predetermined coin-in threshold so as to allow the player to participate in the lottery drawing; and a central lottery computer located at a remote site and in electronic data communication with the video lottery terminal, the central lottery computer providing a lottery drawing that is displayed by the video lottery terminal.

10. A networked gaming system, comprising;

a slot machine located in a casino, the slot machine having electronic circuitry for controlling the operation of the slot machine and constantly monitoring all coin-in, the slot machine having means for placing a wager, a minimum wager amount and a maximum wager amount;

a video lottery terminal located adjacent to the slot machine, the video lottery terminal, when activated, providing a lottery drawing in which a player may participate, the video lottery terminal comprising a player interface to allow a player to participate in the lottery drawing when the video lottery terminal is activated, the video lottery terminal comprising electronic circuitry in electrical communication with the electronic circuitry of the slot machine, means for generating a lottery ticket and providing that ticket to the player, and a display device, the electronic circuitry of the video lottery terminal being configured to:

generate a totally impartial, random number that defines a predetermined coin-in threshold that is independent of the minimum wager amount and maximum wager amount of the slot machine, constantly monitor the cumulative coin-in wagered by the player since the player last qualified for and participated in the lottery drawing, constantly compare the cumulative coin-in to the predetermined coin-in threshold, and activate the video lottery terminal when the cumulative coin-in meets the predetermined coin-in threshold so as to allow the player to participate in the lottery drawing; and a central lottery computer located at a remote site and in electronic data communication with the video lottery terminal, the central lottery computer transmits a live lottery drawing that is displayed by the display device of the video lottery terminal.

* * * * *

UNITED STATES PATENT AND TRADEMARK OFFICE

CERTIFICATE OF CORRECTION

PATENT NO. : 6,685,563 B1 
DATED : February 3, 2004
INVENTOR(S) : Meekins et al.

It is certified that error appears in the above-identified patent and that said Letters Patent is hereby corrected as shown below:

<u>Column 13,</u>
Line 40, delete "control" and replace with -- controller --.
Line 43, insert -- further comprising -- after "claim 3".
Line 45, delete "said".
Line 46, delete "control" and replace with -- controller --.

<u>Column 14,</u>
Line 63, delete "transmits" and replace with -- transmitting --.

Signed and Sealed this

Twenty-eighth Day of September, 2004

JON W. DUDAS
*Director of the United States Patent and Trademark Office*